United States Patent [19]

Ohtani

[11] Patent Number: 4,825,695

[45] Date of Patent: May 2, 1989

[54] LIQUID LEVEL INDICATOR

[75] Inventor: Yukio Ohtani, Shimada, Japan

[73] Assignee: Yazaki Corporation, Japan

[21] Appl. No.: 113,650

[22] Filed: Oct. 28, 1987

[30] Foreign Application Priority Data

Oct. 29, 1986 [JP] Japan ............................ 61-164943[U]
Nov. 12, 1986 [JP] Japan ............................ 61-172561[U]

[51] Int. Cl.⁴ ........................ G01F 23/00; G01F 23/04
[52] U.S. Cl. .................................... 73/290 R; 73/317;
340/620; 248/317
[58] Field of Search ...................... 73/317, 290 R, 295;
248/317, 327; 340/620, 622

[56] References Cited

U.S. PATENT DOCUMENTS

| 704,442 | 7/1902 | Doellinger | 73/317 |
|---|---|---|---|
| 1,530,738 | 3/1925 | Resek | 73/317 |
| 1,804,420 | 5/1931 | Kelley | 248/317 |
| 2,240,669 | 5/1941 | Russo | 73/317 |
| 2,584,446 | 2/1952 | Hastings et al. | 73/317 |
| 2,630,715 | 3/1953 | Hall et al. | 73/317 |
| 2,706,306 | 4/1955 | Sheetz | 248/317 |
| 2,719,896 | 10/1955 | Cain | 340/620 |
| 3,480,246 | 11/1969 | Schwartz et al. | 248/327 |
| 3,821,699 | 6/1974 | Marus et al. | 340/620 |
| 4,532,491 | 7/1985 | Rau et al. | 73/317 |

Primary Examiner—William A. Cuchlinski, Jr.
Assistant Examiner—Thomas B. Will
Attorney, Agent, or Firm—Wigman & Cohen

[57] ABSTRACT

In a liquid level indicator, a liquid level sensor (e.g. thermistor) is attached to a lower end of a sensor shaft fixed to an indicator frame. In the conventional way, the sensor shaft is directly fixed by screws to the frame, so that the sensor shaft is apt to be loosened, resulting in unreliable and inaccurate liquid level indicator or liquid level alarm indication. To overcome these problems, the sensor shaft is fixed to the frame by a single screw to restrict sensor shaft movement in the Z direction and further supported by at least one first and second sensor shaft restriction members to restrict sensor shaft movement in the X-Y directions. The restriction members are U-shaped support members or a shaft bent end insertion hole molded together with the frame or metal parts welded to the frame.

8 Claims, 5 Drawing Sheets

F I G. 3A
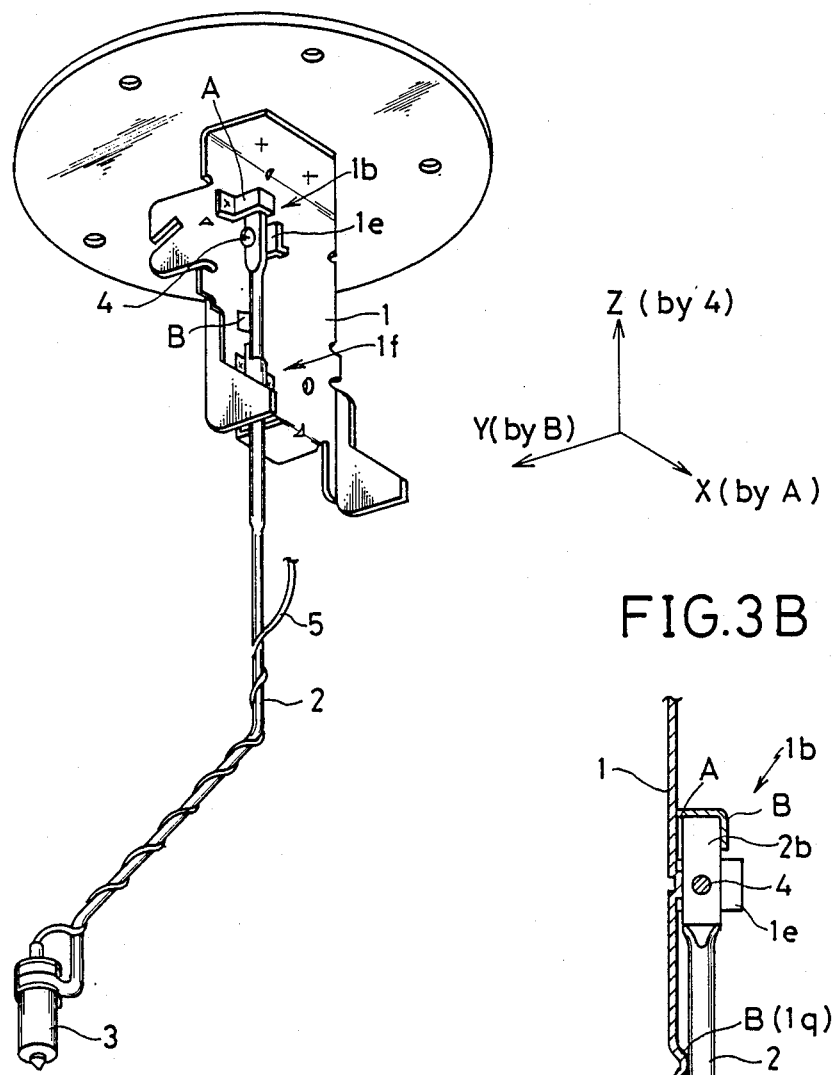

LIQUID LEVEL INDICATOR

BACKGROUND OF THE INVENTION

1. Field of the Invention

The present invention relates to a liquid level indicator, and more specifically to a structure of supporting a shaft for mounting a liquid level sensor.

2. Description of the Prior Art

Liquid level indicators are used to measure fuel remaining within a fuel tank for an automotive vehicle, for instance, or to generate an alarm signal when fuel remaining within the fuel tank decreases below a predetermined level.

The liquid level alarm indicator is usually composed of an alarm signal generating section and an alarm signal displaying section. In the alarm signal generating section, a thermistor element, a float switch, an electrode, etc. are used to detect the presence or absence of liquid at a predetermined level.

When a thermistor element is used, for instance, since heat dissipation of the thermistor element in fuel is large, self-heating phenomenon will not occur, so that the resistance of the element is relatively high. On the other hand, when fuel level decreases and therefore the thermistor element is exposed to air, since the heat dissipation becomes small, self-heating phenomenon occurs, so that the resistance thereof decreases with increasing temperature to increase circuit current which turns on an alarm lamp.

In the prior-art liquid level indicator, however, a shaft for mounting a liquid level sensor (e.g. thermistor element) is simply fixed to a frame by two screws, when force is applied to the sensor element or the shaft via liquid along various directions, there exists a problem in that thin-wall portions of the sensor shaft through which screws are passed are subjected to deformation. In addition, there exist other problems such that when mechanical or thermal shock is applied to the sensor shaft during assembling, the screws are easily loosened and therefore the sensor shaft becomes loose relative to the frame or is removed from the shaft at the worst.

These drawbacks result in a dislocation of the sensor and therefore deteriorate the reliability of liquid level indication or liquid level alarm indication. Furthermore, the looseness of the sensor shaft relative to the frame will cause noise within the fuel tank when the tank is vibrated.

The arrangement of the prior-art sensor shaft supporting structure for liquid level indicators will be described in further detail hereinafter with reference to the attached drawing under DETAILED DESCRIPTION OF THE PREFERRED EMBODIMENTS.

SUMMARY OF THE INVENTION

With these problems in mind, therefore, it is the primary object of the present invention to provide a liquid level indicator in which the sensor shaft can be securely fixed to the frame so as to provide resistance against mechanical or thermal shocks applied to the sensor shaft along various directions and therefore enable a stable and accurate liquid level sensing operation.

To achieve the above-mentioned object, a liquid level indicator having a frame; a sensor shaft fixed to the frame; and a sensor fixed to a lower and of the sensor shaft to detect presence or absence of liquid, according to the present invention, comprises: (a) a screw passed through a hole formed in an upper end of the sensor shaft along a direction perpendicular to a first sensor shaft axial direction to restrict sensor shaft movement in the first sensor shaft axial direction; (b) at least one first sensor shaft restriction members provided for the frame in contact with the sensor shaft to restrict sensor shaft movement in a second screw axial direction; and (c) at least one second sensor shaft restriction member also provided for the frame in contact with the sensor shaft to restrict sensor shaft movement in a third direction perpendicular to the first sensor shaft axial direction and the second screw axial direction.

The first sensor shaft restriction member is walls of an upper U-shaped support member to which an uppermost end of the sensor shaft is fitted, and walls of a lower U-shaped support member to which an intermediate portion of the sensor shaft is fitted. Further, the second sensor shaft restriction member is a back wall of the upper U-shaped support member, a back wall of the lower U-shaped support member, and a projection wall of the frame.

The upper and lwoer U-shaped support members are formed integral with the frame by resin molding process or formed by sheet-metal press working process and fixed to the frame by welding or screws.

Further, the upper U-shaped support member can be replaced with a shaft bent end insertion hole formed in the frame extending in the third direction to which an upper bent end of the sensor shaft is inserted.

BRIEF DESCRIPTION OF THE DRAWINGS

The features and advantages of the liquid level indicator or the sensor support structure thereof according to the present invention over the prior-art structure will be more clearly appreciated from the following description of the preferred embodiments of the invention taken in conjunction with the accompanying drawings in which like reference numerals designate the same or similar elements or sections throughout the figures thereof and in which:

FIG. 3A is a perspective view showing a second embodiment of the sensor shaft supporting structure according to the present invention;

DETAILED DESCRIPTION OF THE PREFERRED EMBODIMENTS

To facilitate understanding of the present invention, a brief reference will be made to a prior-art sensor shaft support structure for a liquid level indicator.

Figure 1:
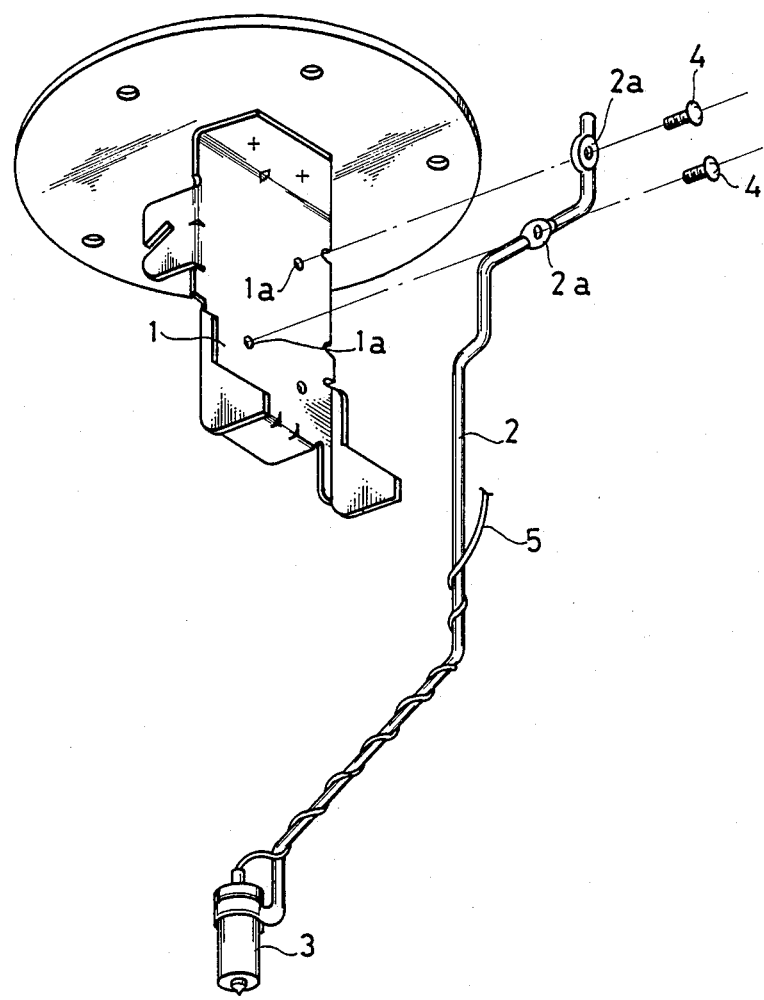
FIG. 1 is a perspective view showing a prior-art sensor shaft supporting structure for a liquid level indicator.

In FIG. 1, a frame 1 of a liquid level indicator is fixed to a fuel tank. The frame 1 is made of metal and formed by a press machine. Various parts (not shown) are mounted on the frame 1, and particularly a sensor support shaft 2 for supporting a liquid level sensor 3 (e.g. thermistor) is fixed to the middle portion of the frame 1 by two screws 4.

In more detail, the shaft 2 is provided with the sensor 3 at the lowermost end thereof. The immediate portion of the shaft 2 is bent at appropriate angles, and two thin-walled portions 2a are formed on the upper end of the shaft 2. The shaft 2 is fixed to the frame 1 by use of two screws 4 passed through the two thin-walled portions 2a and screwed into two tapped holes 1a formed in the frame 1.

In the liquid level indicator as described above, when the thermistor element is in fuel liquid, for instance, since heat dissipation of the thermistor element is large, self-heating will not occur, so that the resistance of the element is relatively high. On the other hand, when fuel level is lowered and therefore the element is exposed to air, since the heat dissipation becomes small, self-heating occurs, so that the resistance of the element decreases to increase circuit current which turns on an alarm lamp. In the drawing, the reference numeral 5 denotes a lead wound around the shaft 1 to connect the sensor (e.g. thermistor) 3 to an instrument (not shown).

In the prior-art indicator, however, when a force is applied to the sensor 3 on the shaft 2 by the liquid within a tank, the force is directly applied to the shaft fixing portions, at which the tapped holes 1a are formed, in various directions, thus resulting in a problem in that the thin-walled portions 2a of the shaft 2 are subjected to deformation. Further, since mechanical and thermal shocks are applied to the portions 2a during assembling, the screws 4 are apt to be loosened, so that the shaft 2 is loosened or removed from the frame 1. These phenomena result in poor reliability in liquid level indication, alarm indication, etc. due to dislocation of the sensor. In addition, abnormal noise will be generated within the tank when the tank is vibrated.

In view of the above description, reference is now made to a first embodiment of the sensor shaft supporting structure for a liquid level indicator of the present invention.

Figure 2A:
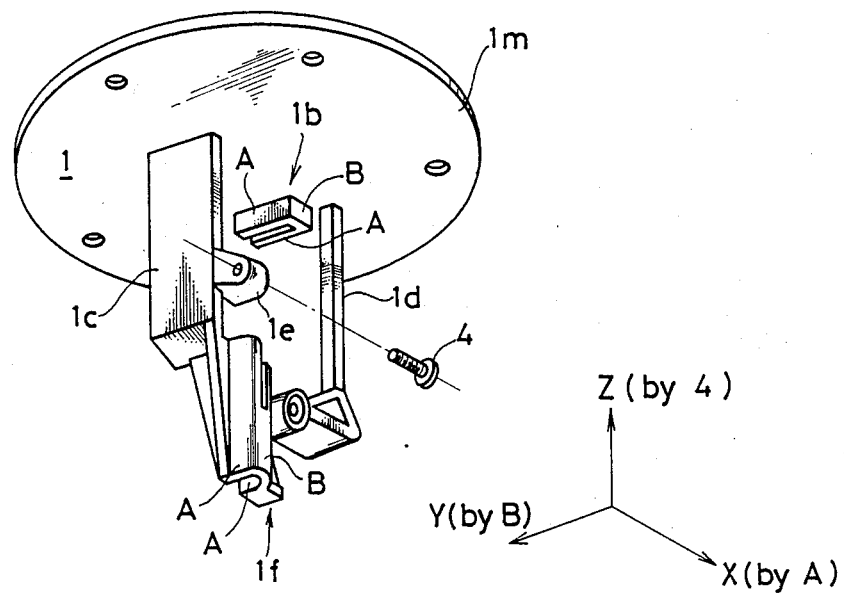
FIG. 2A is a perspective view showing a first embodiment of the sensor shaft supporting structure for a liquid level indicator according to the present invention.
Figure 2A:
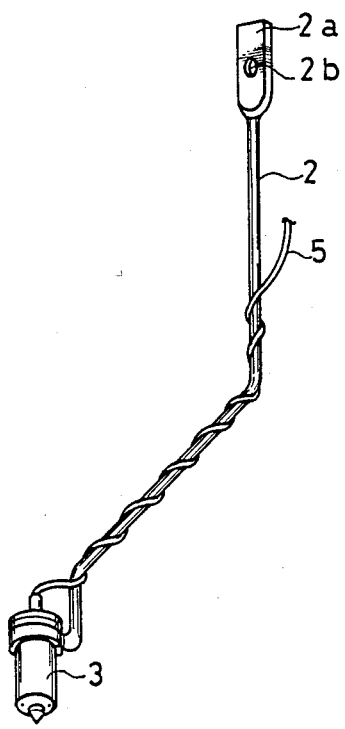
Figure 2B:
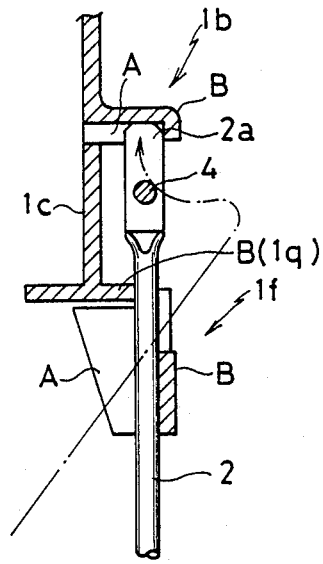
FIG. 2B is an enlarged fragmentary cross-sectional view of the essential portion of the first embodiment shown in FIG. 2A.

FIG. 2A is a perspective view thereof and FIG. 2B is an enlarged cross-sectional view showing the essential portion thereof.

A frame 1 is formed by molding synthetic resin at a single step. The frame 1 includes a base plate 1m; an upper U-shaped shaft support member 1b located at the center of the under surface of the base plate 1m; two downward-extending legs 1c and 1d disposed on both the sides of the support member 1b; a bracket 1e formed with a tapped hole at the center thereof and attached to one side surface of one 1c of the two legs; and a lower U-shaped shaft support member 1f.

A shaft 2 is formed with a thin-walled portion 2a at the uppermost end thereof, and a screw insertion hole 2b is formed at the thin-walled portion 2a.

As depicted in FIG. 2B, the top of the thin wall portion 2a of the sensor shaft 2 is engaged with the U-shaped shaft support member 1b, and the intermediate portion of the sensor shaft 2 is fitted to the lower shaft support member 1f, respectively. In addition, the sensor shaft 2 is supported by the frame 1 by a screw 4 passed through the screw insertion hole 2b of the shaft 2 and screwed into a tapped hole of the bracket 1e of the frame 1.

In the shaft 2 thus supported, the movement of the shaft 2 in the axial direction (z direction in the drawings) is restricted by the screw 4; the movement thereof in the screw insertion direction (X direction in the drawing) is restricted by both the side walls A of the upper U-shaped support member 1b and also both the side walls A of the lower U-shaped support member 1f; and the movement thereof in the third direction (Y direction in the drawing) perpendicular to the shaft axial direction Z and the screw insertion direction X is restricted by the back wall B of the upper U-shaped support member 1b, the curved back wall B of the lower U-shaped support member 1f and a projecting wall B (1q) (shown in FIG. 2B) formed on the upper portion of the lower U-shaped support member 1f.

Therefore, the screw 4 is a restriction member along the shaft axial (Z) direction; both the walls A of the upper and lower support member 1b and 1f constitute a first sensor shaft restriction member A along the screw insertion direction X; the back wall B of the upper support member 1b and the curved back wall B and the projecting wall B(1q) of the lower support member 1f constitutes a second sensor shaft restriction member B along the third direction Y.

Further, when the shaft 2 is fitted to the frame 1, the top end of the shaft 2 is inserted into a frame from below and fixed to the frame 1 by the screw 4 as shown by the dot-dashed arrow in FIG. 2B.

In the above embodiment, since the direction along which a force is applied to the screw 4 is only the shaft axial direction (Z direction) perpendicular to the screw fastening (X) direction, there hardly exists a possibility of the screw 4 being loosened.

Figure 3B:
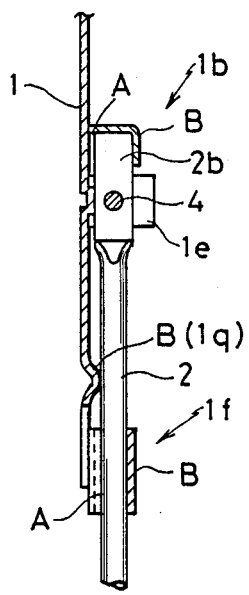
FIG. 3B is an enlarged fragmentary cross-sectional view of the essential portion of the second embodiment shown in FIG. 3A.

FIG. 3A is a perspective view of the second embodiment, and FIG. 3B is a cross-sectional view of the same embodiment.

In this embodiment, the frame 1 and other parts are all made of metal and formed by press machines. The U-shaped upper and lower support members 1b and 1f are separately fixed by screws or welded to the frame 1. Further, the bracket 1e and the projecting wall B (1q) can be formed together by a press machine. The structural feature of the second embodiment is the same as the first embodiment except the material of the frame 1, the sensor shaft restriction members A and B, and the method of forming the frame 1, therefore the function being the same as that of the first embodiment.

Further, in the above embodiments 1 and 2, the hole 2b of the shaft 2 through which the screw 4 is inserted is circular in shape. However, when the movement of the shaft 2 is restricted in the axial direction, one side of the hole 2b can be cut off open.

Figure 4A:
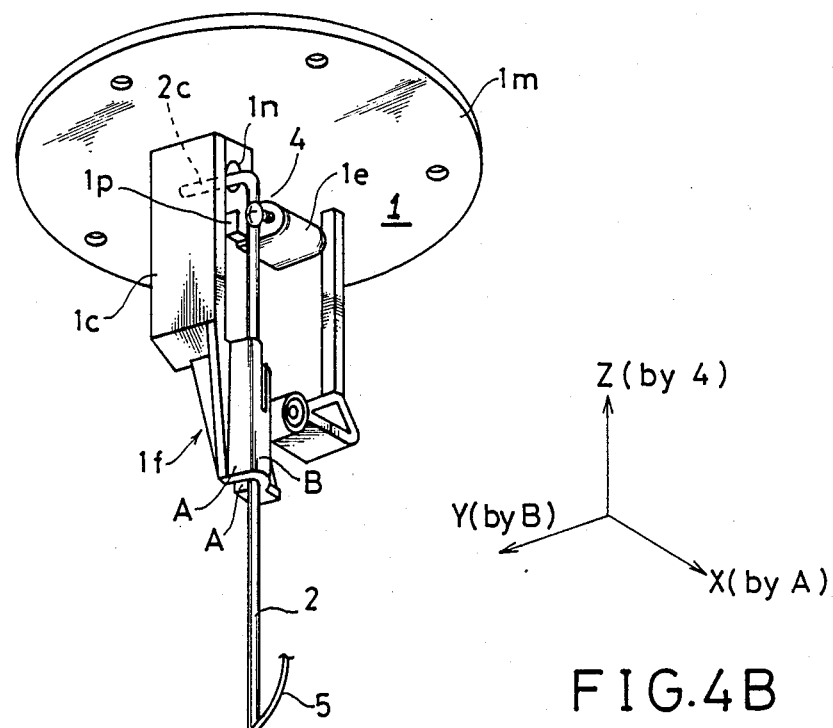
FIG. 4A is a perspective view showing a third embodiment of the sensor shaft supporting structure according to the present invention.
Figure 4B:
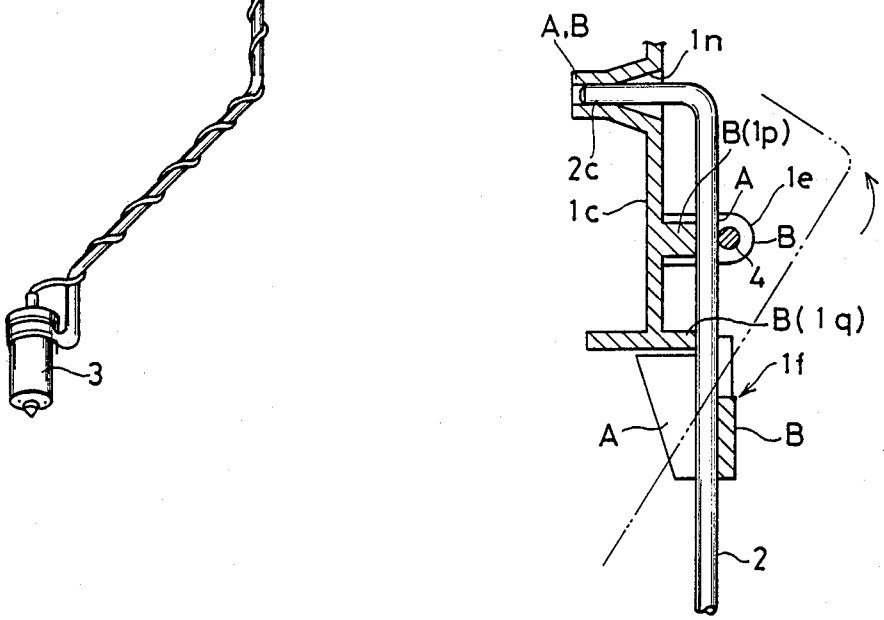
FIG. 4B is an enlarged fragmentary cross-sectional view of the essential portion of the third embodiment shown in FIG. 4A.

FIG. 4A is a perspective view of the third embodiment of the sensor shaft supporting structure for a liquid level indicator according to the present invention, and FIG. 4B is an enlarged cross-sectional view showing the essential portion thereof.

In this embodiment, the upper shaft support member 1b shown in FIGS. 2A and 3A is replaced with a hole formed in the frame.

A frame 1 is formed by molding synthetic resin at a single step. The frame 1 includes a base plate 1m, a downward-extending wall 1c formed on the lower surface of the base plate 1m, a shaft bent end insertion hole 1n formed at the middle upper portion of the downward-extending wall 1c in parallel with the base plate 1m, a bracket is formed under the hole 1n, a locate wall 1p extending perpendicular to the bracket 1e, a U-shaped lower shaft support member 1f under the above parts, and a projecting wall B (1q) on the upper portion of the lower shaft support member 1f.

An upper end of the shaft 2 is bent into L-shape, and this end 2c is inserted into the shaft bent end insertion hole 1n. The shaft 2 is sandwiched between the locate wall 1p and the screw 4 at the bracket 1e, and the middle portion of the shaft 2 is in contact with the projecting wall B (1q) and also inserted into the lower U-shaped shaft support member 1f.

When the end 2c of the shaft 2 is fitted to the shaft insertion hole 1n, the movement of the shaft 2 is restricted in the axial direction (Z direction in the drawing). Further, the movement of the shaft 2 is restricted in the screw mounting direction (X direction in the drawing) by the engagement between the shaft 2 and the shaft insertion hole 1n and both side walls A of the U-shaped lower shaft support member 1f. Furthermore, the movement of the shaft 2 is restricted in the third direction (Y direction) perpendicular to the shaft and screw axial (X) directions by the locate wall 1p, the screw 4, the projecting wall B (1q), and the back wall B of the U-shaped lower shaft suport member 1f.

Therefore, the screw insertion hole 1n is a restriction member for restricting the movement of the shaft in the shaft axial (Z) direction; the shaft insertion hole 1n and both side walls A of the U-shaped lower shaft support member 1f are a first restriction member A; the screw 4 is a restriction member B for restricting the movement of the third direction (Y) in cooperation with the locate wall 1p, the projecting wall B(1q); and the back wall B of the U-shaped lower shaft support member 1f.

Further, when the shaft 2 is fitted to the frame 1, as shown by the arrow in FIG. 4B, the end 2c of the shaft 2 is inserted from under the frame into the shaft bent end insertion hole 1n, and then the screw 4 is fastened. Since the inlet portion of the shaft insertion hole 1n is formed into an oval shape having a major axis extending in the shaft axial direction (Z direction) as depicted in FIG. 4A, the shaft insertion work is easy.

In the above embodiment, the direction of force applied to the screw 4 is only the shaft axial direction Z perpendicular to the screw fastening direction X (screw axial direction), there exists a little possibility of the screw 4 being loosened even if some force is applied to the screw.

Figure 5A:
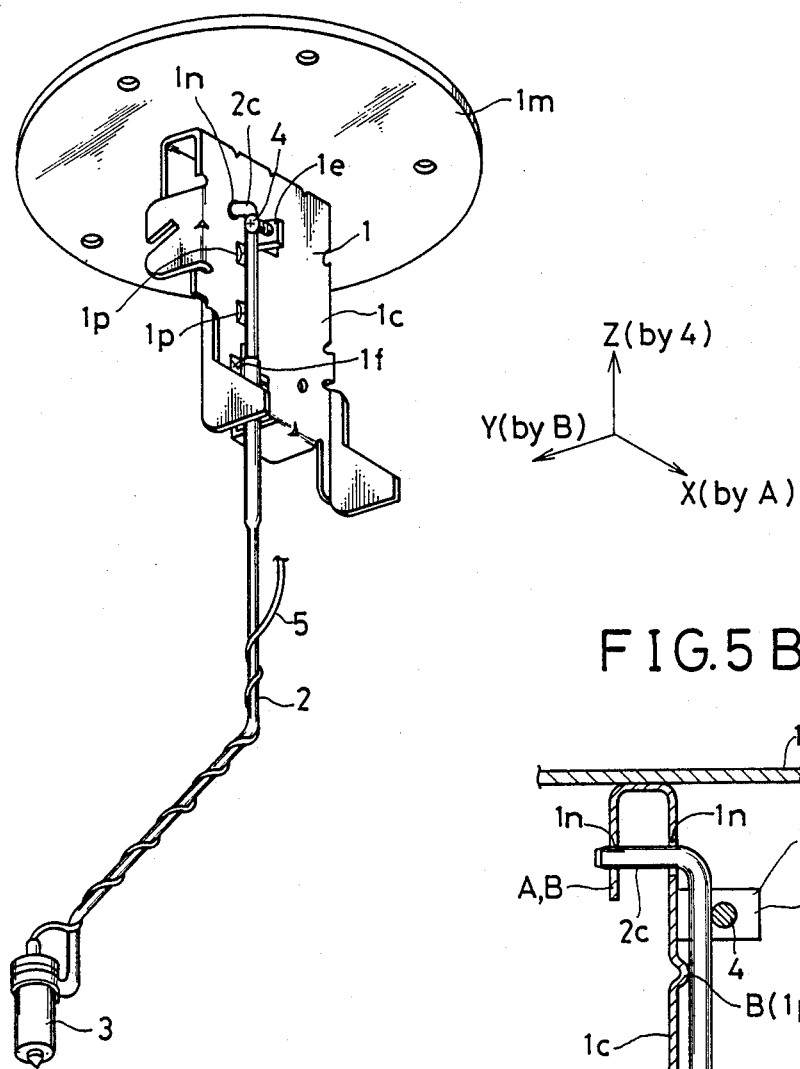
FIG. 5A is a perspective view showing fourth embodiment of the sensor shaft supporting structure according to the present invention.
Figure 5B:
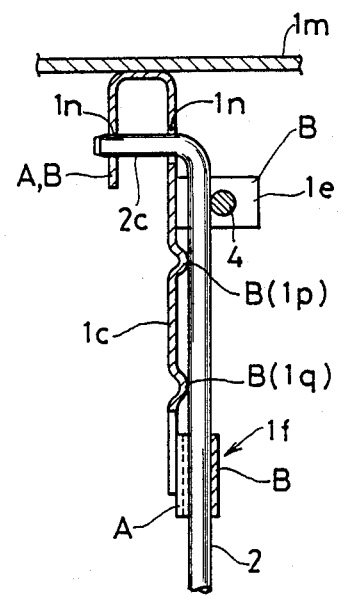
FIG. 5B is an enlarged fragmentary cross-sectional view of the essential portion of the fourth embodiment shown in FIG. 5A.

FIG. 5A is a perspective view of the fourth embodiment, and FIG. 5B is a cross-sectional view of the same embodiment.

In this embodiment, the frame 1 is a metallic press formed parts, and the other portions formed in the frame 1 such as the shaft insertion hole 1n, the bracket 1e, the locate wall B (!p), the projecting wall B (1q), U-shaped lower shaft support member 1f etc. are all formed similarly in press machine formation, and separately fixed to the frame 1 by welding and screws.

However, the supporting function of the sensor shaft 2 to the frame 1 is quite the same as that of the third embodiment.

As described above, according to the present invention, the screw is so arranged that force applied to the screw in various directions perpendicular to the screw axial direction can be reduced, and force is applied to the screw only in the shaft axial direction (Z). Therefore, there exists a little possibility of the screw being loosened and the thin-wall portion of the shaft through which the screw is passed will not be deformed, thus realizing a stable and accurate liquid level indication or liquid level alarm indication.

What is claimed is:

1. A liquid level indicator, comprising;
   (a) a frame (1) having a first upper U-shaped support member (1b) formed integral with said frame and having two walls (A) extending in a first horizontal direction (Y), a second lower U-shaped support member (1f) also formed integral with said frame and having two walls (A) also extending in the first horizontal direction (Y), and a bracket (1e) formed integral with said frame and having a threaded hole;
   (b) a sensor shaft (2) having an upper end flat thin-wall portion (2a) inserted into said first upper U-shaped support member (1b) to restrict sensor shaft movement in a second horizontal direction (X) perpendicular to the first horizontal direction (Y), and an intermediate portion fitted to said second lower U-shaped support member (1f) to restrict sensor shaft movement in the second horizontal direction (X);
   (c) a screw (4) passed through a hole (2b) formed in the upper end flat thin-wall portion (2a) of said sensor shaft (2) and screwed into the threaded hole of said bracket (1e) along the second horizontal direction (X) to restrict sensor shaft movement in the sensor shaft axial direction (Z) perpendicular to said first and second directions (X,Y); and
   (d) a sensor (3) fixed to a lower end of said sensor shaft to detect presence or absence of liquid.

2. The liquid level indicator of claim 1, wherein said frame is further formed with a projection wall (1q) integral with said frame to restrict sensor shaft movement in the first direction (Y) in cooperation with a back wall (B) of the lower U-shaped support member (1f).

3. A liquid level indicator, comprising;
   (a) a frame (1) having a first upper U-shaped support member (1b) fixed to said frame and having two walls (A) extending in a first horizontal direction (Y), a second lower U-shaped support member (1f) also fixed to said frame and having two walls (A) also extending in the first horizontal direction (Y), and a bracket (1e) fixed to said frame and having a threaded hole;
   (b) a sensor shaft (2) having an upper end flat thin-wall portion (2a) inserted into said first upper U-shaped support member (1b) to restrict sensor shaft movement in a second horizontal direction (X) perpendicular to the first horizontal direction (Y), and an intermediate portion fitted to said second lower U-shaped support member (1f) to restrict sensor shaft movement in the second horizontal direction (X);
   (c) a screw (4) passed through a hole (2b) formed in the upper end flat thin-wall portion (2a) of said sensor shaft (2) and screwed into the threaded hole of said bracket (1e) along the second horizontal direction (X) to restrict sensor shaft movement in the sensor shaft axial direction (Z) perpendicular to said first and second directions (X,Y); and (d) a sensor (3) fixed to a lower end of said sensor shaft to detect presence or absence of liquid.

4. The liquid level indicator of claim 3, wherein said frame is further formed with a projection wall (1q) integral with said frame to restrict sensor shaft movement in the first direction (Y) in cooperation with a back wall (B) of the lower U-shaped support member (1f).

5. A liquid level indicator having:

(a) a frame (1) formed with a shaft bent end insertion hole (1n) extending in a first horizontal direction (Y) and with a lower U-shaped support member (1f) having two walls (A) extending in the first horizontal direction (Y);

(b) a sensor shaft (2) having an upper bent end (2c) inserted into the shaft bent end insertion hole (1n) of said frame to restrict sensor shaft movement in a second horizontal direction (X) perpendicular to the first horizontal direction (Y) and in a vertical direction (Z), said sensor shaft (2) being fitted between the two walls (A) of the lower U-shaped support member (1f) to restrict sensor movement also in the second horizontal direction (X); and (c) a sensor (3) fixed to a lower end of said sensor shaft to detect presence or absence of liquid.

6. The liquid level indicator of claim 5, wherein said frame is further formed with a locate wall (1p) and a projection wall (1q) to restrict sensor shaft movement in the first direction (Y) in cooperation with a back wall (B) of the lower U-shaped support member (1f).

7. The liquid level indicator at set forth in claim 6, wherein said shaft bent end insertion hole (1n) and said lower U-shaped support member (1f) are formed integral with the frame by resin molding process.

8. The liquid level indicator at set forth in claim 6, wherein said shaft bent end insertion hole (1n) and said lower U-shaped support member (1f) are formed by sheet-metal press working process and fixed to the frame by welding or screws.

* * * * *